US008334914B2

(12) United States Patent
Kita

(10) Patent No.: US 8,334,914 B2
(45) Date of Patent: Dec. 18, 2012

(54) GRADATION CORRECTING APPARATUS, AND RECORDING MEDIUM STORING A PROGRAM RECORDED THEREIN

(75) Inventor: Kazunori Kita, Mizuho-machi (JP)

(73) Assignee: Casio Computer Co., Ltd, Tokyo (JP)

( * ) Notice: Subject to any disclaimer, the term of this patent is extended or adjusted under 35 U.S.C. 154(b) by 490 days.

(21) Appl. No.: 12/614,806

(22) Filed: Nov. 9, 2009

(65) Prior Publication Data

US 2010/0177215 A1 Jul. 15, 2010

(30) Foreign Application Priority Data

Jan. 15, 2009 (JP) ................................. 2009-006641
Sep. 14, 2009 (JP) ................................. 2009-211169

(51) Int. Cl.
*H04N 5/202* (2006.01)
*H04N 5/208* (2006.01)

(52) U.S. Cl. ......... 348/254; 348/234; 348/241; 348/252

(58) Field of Classification Search .................. 382/266; 348/234, 252, 254
See application file for complete search history.

(56) References Cited

U.S. PATENT DOCUMENTS

| 5,070,405 | A  | * | 12/1991 | Ejima et al. ...................... 348/26 |
| 6,670,992 | B2 | * | 12/2003 | Irie ................................ 348/350 |
| 6,693,669 | B1 | * | 2/2004  | Wu et al. ........................ 348/254 |
| 7,773,826 | B2 | * | 8/2010  | Watanabe et al. ............. 382/274 |
| 2008/0129860 | A1 | * | 6/2008 | Arakawa ........................ 348/363 |
| 2008/0240237 | A1 | * | 10/2008 | Tian et al. ................. 375/240.03 |
| 2009/0097707 | A1 | * | 4/2009  | Yi et al. ......................... 382/103 |

FOREIGN PATENT DOCUMENTS

| JP | 11-275341 | 10/1999 |
| JP | 2006-50085 | 2/2006 |
| JP | 2008-118383 | 5/2008 |

OTHER PUBLICATIONS

Chinese Office Action for Chinese Application No. 201010003696.5 mailed on Oct. 10, 2011.

* cited by examiner

*Primary Examiner* — Ngoc-Yen Vu
(74) *Attorney, Agent, or Firm* — Turocy & Watson, LLP

(57) ABSTRACT

Plural areas defined by contours in a through image (live view image) are previously set as object segments whose luminance levels are to be altered. When a user touches a point within an object segment seen in the through image displayed on a touch panel LCD 12, a gamma curve is changed to alter a luminance level of the object segment including the touched point. This arrangement allows the user to make more bright the whole of the object segment simply by touching a point within the object segment, and also to select any segment of an object as the object segment whose luminance level is to be altered.

6 Claims, 16 Drawing Sheets

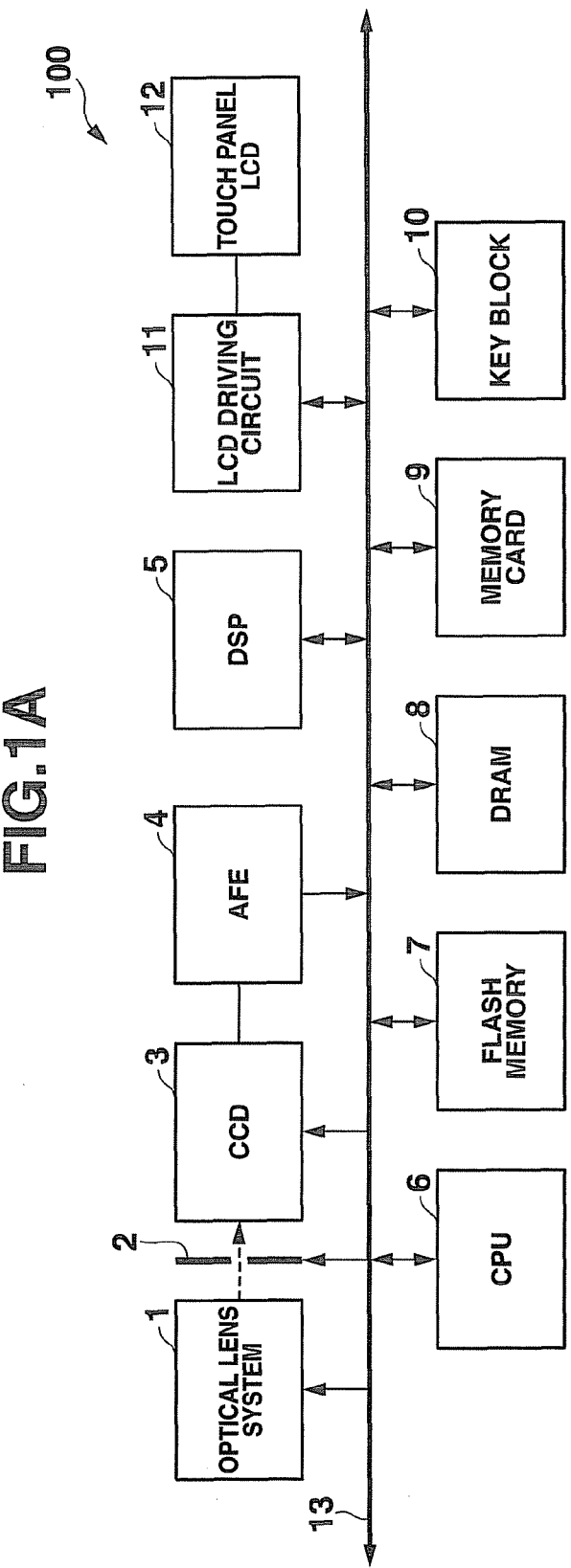
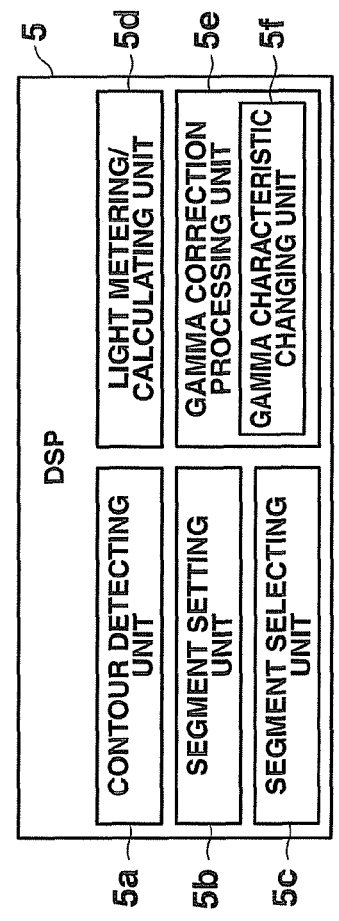

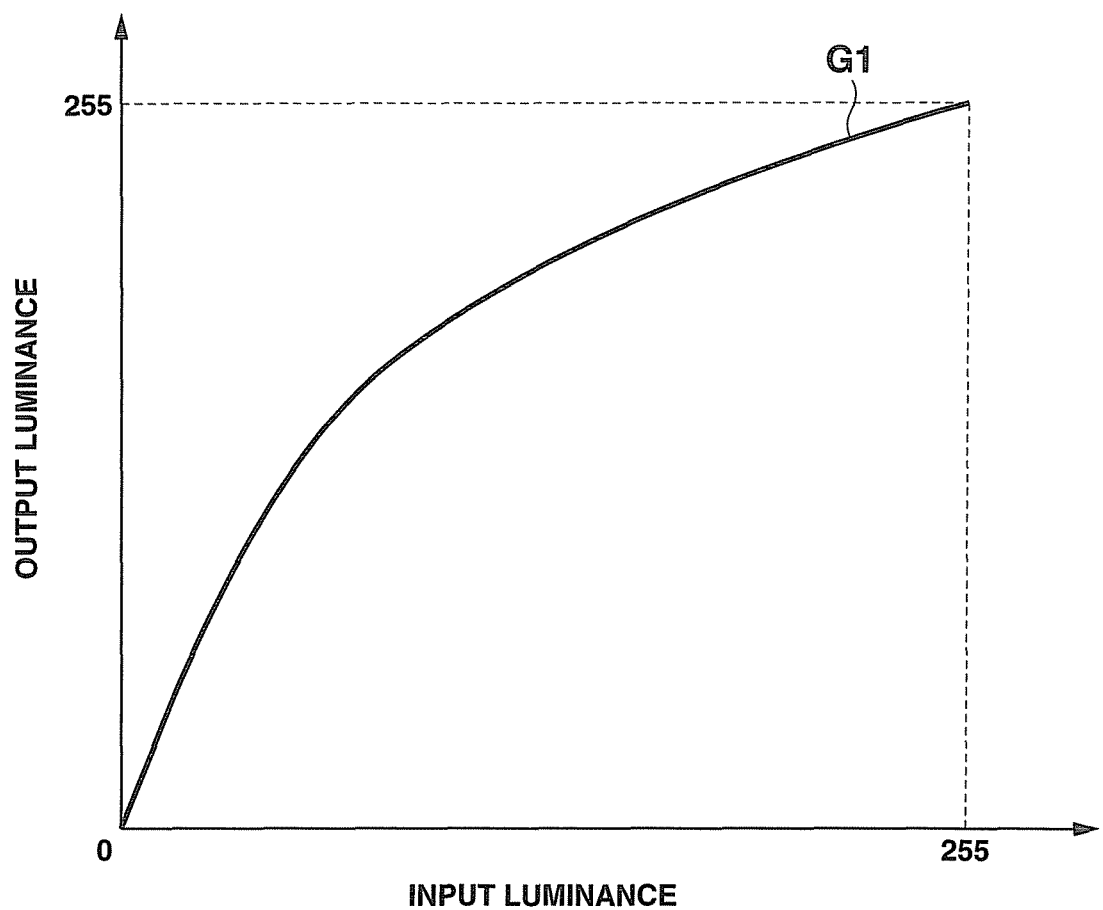

GRADATION CORRECTING APPARATUS, AND RECORDING MEDIUM STORING A PROGRAM RECORDED THEREIN

BACKGROUND OF THE INVENTION

1. Field of the Invention

The present invention relates to an image processing apparatus, and more particularly to an image processing apparatus for altering brightness of images.

2. Description of the Related Art

Conventional image pick-up apparatuses such as digital cameras, have a gradation correcting function for correcting a gradation of an picked up image. Using this gradation correcting function, an image can be obtained of a more clear object than the original picked up image.

A patent document 1 discloses a digital camera provided with the gradation correcting function. The digital camera disclosed in the patent document 1 displays a through image (a live view image) on a touch panel LCD, allowing a user to touch a position in a main object seen in the displayed thorough image to designate a certain area of the through image, and adjusts a gradation altering characteristic in a luminance range of a gamma correction for correcting an image signal expressing the designated certain area of the through image, thereby adjusting brightness of the main object seen in the through image. The digital camera disclosed in the patent document 1 allows the user to touch and designate a position in the main object of the picked up image to make brighter a predetermined area in the main object of the picked up image.

A patent document 2 discloses an image pickup apparatus, which changes a gradient assignment ratio to concentrate a gradient on a face portion and/or focused portion in an picked up image. The image pickup apparatus disclosed by the patent document 2 can change a brightness level at the face portion and/or focused portion seen in the picked up image, making the face portion and/or focused portion more clear.

The patent document 1 is Japanese Patent No. 2006-50085 A, and the patent document 2 is Japanese Patent No. 2008-118383 A.

The digital camera disclosed in the patent document 1 can correct a brightness level of only the predetermined area including the position in the through image touched and designated by the user. Therefore, in the case that the user wants to correct the brightness level of the whole area of the main object, the user is required to repeatedly perform troublesome operations, touching the through image several times to designate the whole area of the main object.

In the image pickup apparatus disclosed in the patent document 2, the area whose luminance level is to be changed is previously determined. Therefore, the image pickup apparatus has a disadvantage that cannot correct the brightness level of an area(s) other than the area previously determined.

The present invention has an object to provide an apparatus which can easily alter luminance levels of arbitrary areas of a picked up image.

SUMMARY OF THE INVENTION

According to one aspect of the present invention, there is provided an image processing apparatus, which comprises a gradation correcting unit for correcting a gradation of an image in accordance with a gradation altering characteristic, an object segment setting unit for setting in the image plural object segments whose luminance levels are to be altered, an object segment selecting unit for selecting one object segment from the plural object segments set by the object segment setting unit in response to a single operation by a user, and a gradation altering characteristic changing unit for changing the gradation altering characteristic in a luminance range of the object segment selected by the object segment selecting unit.

According to another aspect of the invention, there is provided a computer readable recording medium mounted on an image processing apparatus provided with a computer, the recording medium having recorded thereon a computer program when executed to make the computer function as units, which comprises a gradation correcting unit for correcting a gradation of an image in accordance with a gradation altering characteristic, an object segment setting unit for setting in the image plural object segments whose luminance levels are to be altered, an object segment selecting unit for selecting one object segment from the plural object segments set by the object segment setting unit in response to a single operation by a user, and a gradation altering characteristic changing unit for changing the gradation altering characteristic in a luminance range of the object segment selected by the object segment selecting unit.

In the image processing apparatus of the present invention, plural areas in an image are set as object segments, and a gradation altering characteristic is changed to alter a luminance level of an object segment which is selected from the plural object segments in response to user's single operation. Therefore, a luminance level of the whole of an arbitrary object segment can be altered simply by user's single operation.

BRIEF DESCRIPTION OF THE DRAWINGS

FIG. 1A is a block diagram of an electric configuration of a digital camera 100.

FIG. 1B is a view showing a detailed configuration of DSP (Digital Signal Processor) 5 in the digital camera 100.

FIG. 2 is a view showing a gamma curve G1 applied in a general gamma correction process.

DETAILED DESCRIPTION OF PREFERRED EMBODIMENTS

First Embodiment of the Invention

Figure 3:
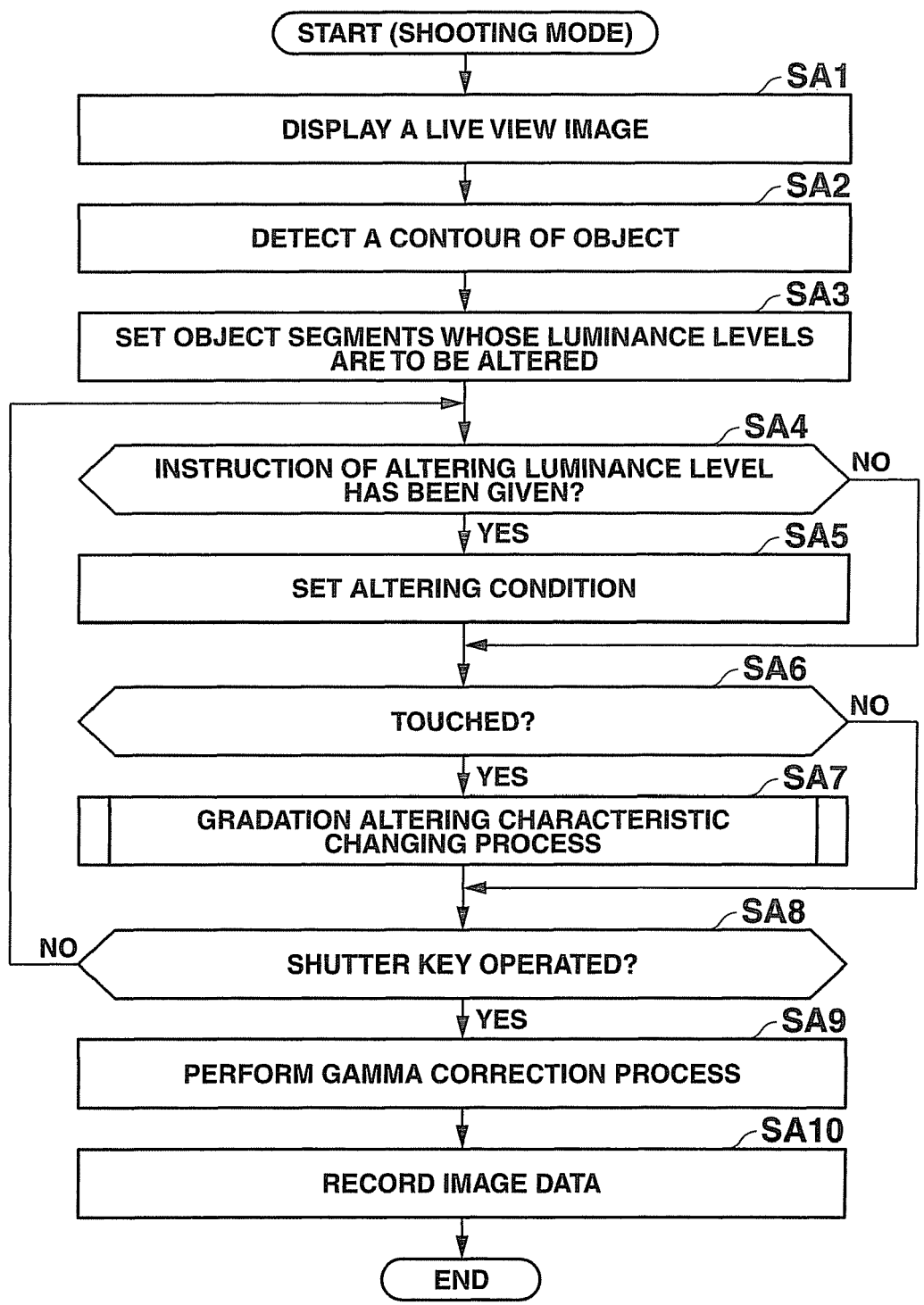
FIG. 3 is a flow chart of an operation performed in a shooting mode in the first embodiment of the invention.

Now, the first embodiment of the present invention will be described in detail with reference to the accompanying drawings. In the first embodiment, an image processing apparatus of the present invention is applied to a digital camera 100.

FIG. 1A is a block diagram illustrating a circuit configuration of the digital camera 100 in the first embodiment of the invention. With reference to FIG. 1A, various units of the digital camera 100 will be described.

As shown in FIG. 1A, the digital camera 100 comprises an optical lens system 1, a shutter mechanism 2, CCD (Charge Coupled Device) 3, AEF (Analog Front End) 4, DSP (Digital Signal Processor) 5, CPU (Central Processing Unit) 6, a flash memory 7, DRAM (Dynamic Random Access Memory) 8, a memory card 9, a key block 10, LCD driving circuit 11, and a touch panel LCD 12. All of these elements are electrically connected with each other through a system bus 13.

The optical lens system 1 is prepared for allowing an optical image of an object to focus therein. The optical lens system 1 comprises a shooting lens including focus lenses (not shown) and zoom lenses (not shown), and a lens driving mechanism (not shown) for driving the shooting lens (focus lenses and zoom lenses). The lens driving mechanism drives the focus lenses and zoom lenses along the optical axis in accordance with a control signal supplied from CPU 6.

The shutter mechanism 2 serves as an aperture and a mechanical shutter. The aperture is a mechanism for serving to adjust a light volume of a light incoming from the object through the optical lens system 1. The shutter mechanism 2 serves to adjust an exposure time, during which CCD 3 is exposed to light. The shutter mechanism 2 drives the mechanical shutter to open and/or close in accordance with the control signal supplied from CPU 6.

CCD 3 is an image pick-up device (photoelectric conversion element), which is used when the object is shot to convert an optical image of the object into an electric signal. CCD 3 has a light receiving plane with photodiodes disposed thereon. The photodiodes of CCD 3 performs a photoelectric conversion of the optical image of the object focused on the optical lens system 1, thereby accumulating an image signal of the object. A driver (not shown) reads the image signal to supply the same signal to AFE 4.

AFE 4 performs various processes on the image signal supplied from CCD 3 to convert into a digital signal, wherein a correlated double sampling process, amplifying process, and A/D conversion process are included in the various processes performed by the AFE 4. The converted digital signal is stored in DRAM 8. When the image signal is subjected to A/D conversion process in AFE 4, the image signal is converted into a digital signal of 8 bits. Therefore, the digital signal indicates a gradation level in the range of 0 to 255.

DSP 5 performs various processes, including a white balance process, gamma correction and YC conversion, on the digital signal stored in DRAM 8, thereby producing image data with Y signal (luminance signal), Cb signal (blue color-difference signal) and Cr signal (red color-difference signal) superimposed on. The image data produced by DSP 5 is stored in DRAM 8 again. DSP 5 performs a compression process on the image data.

FIG. 1B is a view illustrating a configuration of DSP 5 in detail. As shown in FIG. 1B, DSP 5 serves as a contour detecting unit 5a, a segment setting unit 5b, a segment selecting unit 5c, a light metering/calculating unit 5d, a gamma correction processing unit 5e, and a gamma characteristic changing unit 5f.

The contour detecting unit 5a performs a detecting process for detecting a contour in an image expressed by the digital signal under control of CPU 6, wherein the contour is an outline of an object seen in the image displayed on the touch panel LCD 12. In the following description, a segment surrounded by the contour detected by the contour detecting unit 5a and a segment defined by a frame of a shooting range will be referred to as "object segment(s)".

According to need, a known technique for detecting a contour of an object may be employed as the contour detecting unit 5a in the present embodiment. For example, a technique disclosed in Japanese Patent No. 2004-341844 A may be employed. The technique described in Japanese Patent No. 2004-341844 A uses a contour-intensity enhancement filter to perform a mathematical operation of convolution on the image of the object, thereby detecting a contour of the object from the image of the object. Further, as the contour detecting unit 5a may be used a technique that detects a difference in luminance level between adjacent picture elements in the image and determines as the contour the adjacent picture elements which show the difference higher than a predetermined level. Furthermore, it may be possible to make the contour detecting unit 5a detect the contour of an image that is expressed based on the image data passing through a high pass filter provided in DSP 5. When a shooting mode is set, the contour detecting unit 5a performs a contour detecting process on each of frame images (still images) composing a live view, thereby dynamically detecting a contour of the live view. It may be possible to make the contour detecting unit 5a not to perform the contour detecting process of detecting the contour of the live view every time it receives one frame image, but to perform the contour detecting process of detecting the contour of the live view every time it receives plural frame images.

Under control of CPU 6, the segment setting unit 5b sets object segments of an image expressed based on image data as segments whose luminance levels are to be altered.

Under control of CPU 6, the segment selecting unit 5c selects object segments of the image expressed based on the digital signal stored in DRAM 8 in response to user's touch operation onto the touch panel LCD 12, wherein the object segment includes a point touched by the user. The segment selecting unit 5c sends a signal indicating the selected object segments to the light metering/calculating unit 5d.

Upon receipt of the signal indicating the selected object segment from the segment selecting unit 5c, under control of CPU 6 the light metering/calculating unit 5d extracts an image component of each object segment from the image expressed based on the digital signal stored in DRAM 8. The light metering/calculating unit 5d calculates an average luminance level of the selected object segment of the image expressed based on the digital signal. The light metering/ calculating unit 5d sends the calculated average luminance level of the object segment to the gamma correction processing unit 5e.

Under control of CPU 6, the gamma correction processing unit 5e performs a gamma correction process on the digital signal stored in DRAM 8 in accordance with a gamma curve previously recorded in the flash memory 7.

The gamma correction processing unit 5e has the gamma characteristic changing unit 5f, which changes the gamma correction characteristic. Under control of CPU 6, the gamma characteristic changing unit 5f changes a gradation altering characteristic that is used in the gamma correction process to correct a gradation of the image. The digital signal produced by AFE 4 is a signal representing a level proportional to a light volume of light which CCD 3 receives from the object. But in general, since a human visual feature has a non-linear feature, it is necessary to perform a gradation altering process on the digital signal to obtain an image having a non-linear gradation characteristic satisfying the human visual feature, when the image is displayed and/or recorded. This gradation altering process has the same effect as the gamma correction process. The gradation altering characteristic applied in the gamma correction process is referred to as a "gamma curve".

FIG. 2 is a view showing a gamma curve G1 which is applied in the general gamma correction process. In the conventional image processing technique, the digital signal (image) is subjected to the gamma correction process using the gamma curve G1 shown in FIG. 2 to satisfy the human visual feature. In FIG. 2, the horizontal axis indicates an input luminance level, that is, a luminance level of the digital signal before subjected to the gamma correction process and the vertical axis indicates an output luminance level, that is, a luminance level of the digital signal subjected to the gamma correction process. The gamma correction processing unit 5e alters the gamma curve G1 to a gamma curve G2 in accordance with the user's intention. A detailed process will be described later, in which the gamma correction processing unit 5e alters the gamma curve G1 to the gamma curve G2. The gamma correction processing unit 5e performs the gamma correction process using the altered gamma curve G2.

In FIG. 1A, CPU 6 sends control signals to various units of the digital camera 100, and controls as a whole operations of these units upon receipt of response signals from these units. CPU 6 reads a program from the flash memory 7 to DRAM 8 to run the same. Further, CPU 6 operates various units in accordance with a signal generated in response to user's key operation on the key block 10.

The flash memory 7 is a recording medium storing a program and data for performing processes in accordance with a flow chart to be described later. The flash memory 7 is made of an appropriate semi-conductor memory device.

DRAM 8 is a buffer memory for temporarily storing the digital signal produced by the AFE 4 and the image data generated by DSP 5. DRAM 8 also serves as a working area when CPU 6 performs various processes.

The memory card 9 is a recording medium, on which image data generated in a shooting operation is recorded. The memory card 9 is detachably installed on a camera body of the digital camera 100. The memory card 9 is made of an appropriate semi-conductor memory device.

The key block 10 comprises a shutter key (not shown), a power key (not shown), a cross key (not shown) and a set key (not shown). The key block 10 is operated by the user and sends CPU 6 a control signal corresponding to the user's operation.

LCD driving circuit 11 reads the image data from DRAM 8 and generates video signal from the image data. LCD driving circuit 11 drives picture cells of the touch panel LCD 12 in accordance with the generated video signal, thereby displaying on the tough panel LCD 12 an image represented by the video signal as a live view image. LCD driving circuit 11 comprises VRAM (Video Random Access Memory) and D/A converter (Digital/Analog converter).

The touch panel LCD 12 functions as a monitor (electronic finder) in the shooting mode, and also functions as a touch panel for detecting a position of the touch panel LCD 12 where the user touches with his or her finger or with a pen. The touch panel LCD 12 is provided with a transparent pressure-sensitive touch panel on its display screen. In the following description, user's touch on the display screen of the touch panel LCD 12 with his or her finger or with the per is referred to as "touch operation", and the position of the touch panel LCD 12 where the user touches with his or her finger or with the pen is referred to as a "touch point". When the user touches with his or her finger or with the pen an arbitrary position on the display screen of the touch panel LCD 12, the touch panel LCD 12 calculates coordinates of the touch point on the touch panel LCD 12, and sends CPU 6 a signal indicating the calculated coordinates.

The system bus 13 is a data transmission pass, through which the units of the digital camera 100 are connected to each other, and exchanges data with each other.

FIG. 3 is a flow chart of an operation performed by the digital camera 100 in the shooting mode in the first embodiment of the invention. CPU 6 reads the program from the flash memory 7 and expands the program on DRAM 8, thereby performing the operation in accordance with the flow chart of FIG. 3. The operation performed by the digital camera 100 in the shooting mode will be described in detail with reference to the flow chart of FIG. 3.

CPU 6 displays a live view image (hereinafter, an "image") on the touch panel LCD 12 at step SA1. More specifically, CPU 6 makes DSP 5 supply the produced image data to LCD driving circuit 11, and makes LCD driving circuit 11 drive the touch panel LCD 12 to display a live view image represented by the supplied image data. Thereafter, CPU 6 successively supplies the image data successively produced by DSP 5 to LCD driving circuit 11, thereby displaying live view images on the touch panel LCD 12.

Figure 4:
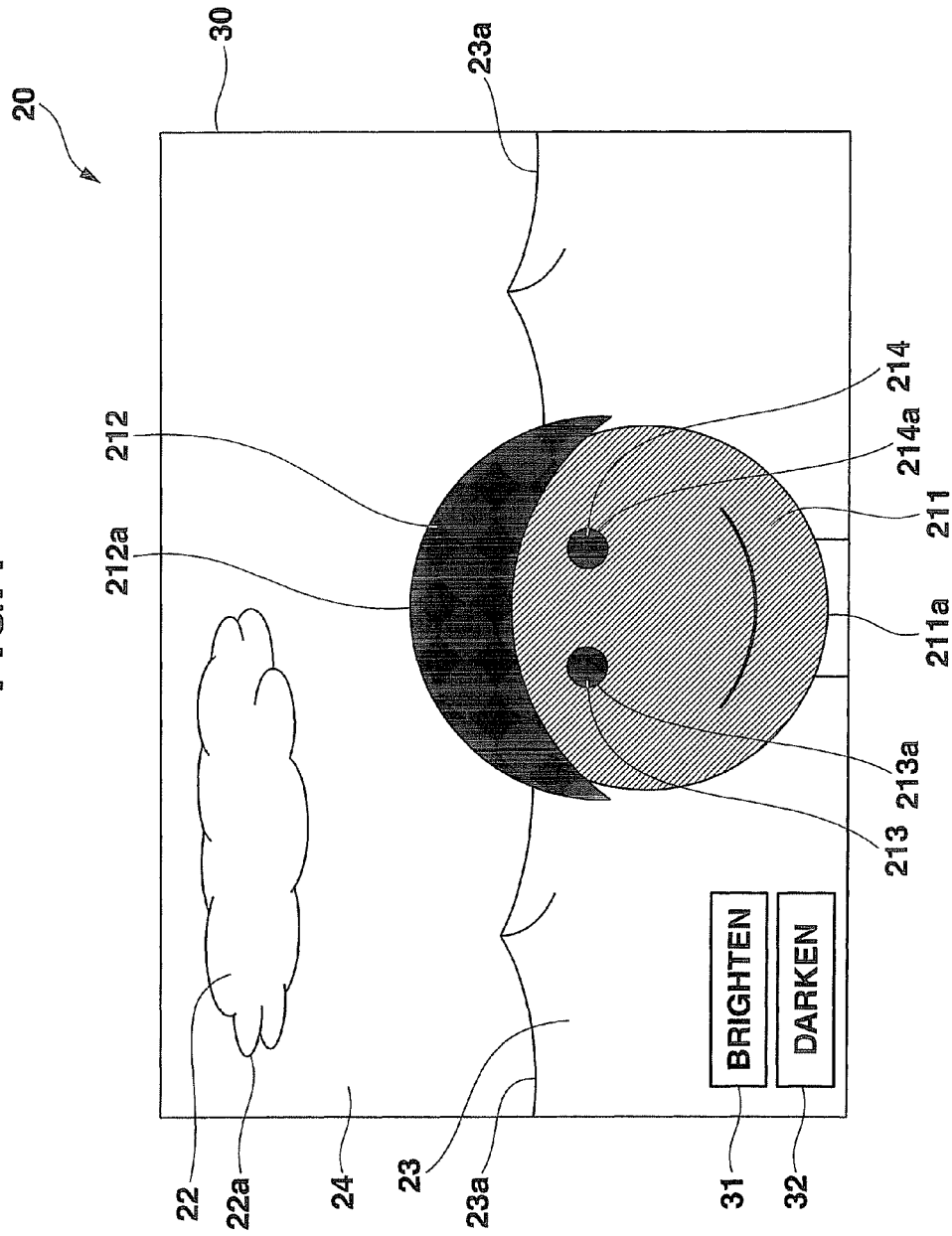
FIG. 4 is a view illustrating an example of an image 20 displayed on a touch panel LCD 12 in the first embodiment.

An image displayed on the touch panel LCD 12 at first is the image which has been corrected in the gamma correction process using the gamma curve G1 shown in FIG. 2. For example, in the case where an image 20 shown in FIG. 4 has been shot in a live view displaying process, an image which is obtained from the image 20 corrected in the gamma correction process using the gamma curve G1 is displayed on the touch panel LCD 12 at first. As shown in FIG. 4, an external frame 30 defines a shooting angle and within the external frame 30 of the image 20 are seen a human face 211, head hair 212, his right eye 213, his left eye 214, cloud 22, mountain 23, and sky 24.

As shown in FIG. 4, a menu item 31 of "Brighten" and a menu item 32 of "Darken" are displayed together with the image 20 on the touch panel LCD 12, wherein the menu item 31 of "Brighten" means an instruction of making higher a luminance level of the touched object segment, and the menu item 32 of "Darken" means an instruction of making lower a luminance level of the touched object segment.

At step SA2, CPU 6 makes the contour detecting unit 5d of DSP 5 detect a contour of an object seen in the image expressed by the digital signal and displayed on the touch panel LCD 12. Take for example the image 20 shown in FIG. 4, a contour 211a of the human face 211, a contour 212a of the head hair 212, a contour 213a of his right eye 213, a contour 214a of his left eye 214, a contour 22a of the cloud 22, and a contour 23a of the mountain 23 are detected in the process at step SA2.

At step SA3, CPU 6 makes the segment setting unit 5b of DSP 5 set plural areas defined by the contours detected at step SA2 as plural object segments whose luminance levels are to be altered. The object segments are closed areas defined by the detected contours or by the external frame 30 defining a shooting angle. Take for example the image 20, the object segments are areas where the human face 211, head hair 212, his right eye 213, his left eye 214, cloud 22, mountain 23, and sky 24 are seen respectively.

CPU 6 judges with the image displayed on the touch panel LCD 12 at step SA4, whether or not an instruction of altering a luminance level has been given by the user. More specifically, CPU 6 determines at step SA4 that the instruction of altering a luminance level has been given (YES at step SA4), when CPU 6 receives from the touch panel LCD 12 a signal indicating the instruction of making higher a luminance level or the instruction of making lower a luminance level in response to user's touch operation with his or her finger or with the pen. Then, CPU 6 advances to step SA5. Meanwhile, CPU 6 determines at step SA4 that the instruction of altering a luminance level has not been given (NO at step SA4), when CPU 6 receives no signal indicating the instruction of altering a luminance level from the touch panel LCD 12, and sets an altering condition according to the menu item 31 of "Brighten". Then, CPU 6 advances to step SA6.

At step SA5, CPU 6 sets the altering condition of "Brighten" or altering condition of "Darken" depending upon a signal sent from the touch panel LCD 12. When the user has touched the menu item 31 of "Brighten" on the touch panel LCD 12, CPU 6 keeps the altering condition of "Brighten" until it receives a signal instructing to the contrary, and CPU 6 records in DRAM 8 data indicating that the altering condition of "Brighten" has been set. Meanwhile, when the user has touched the menu item 32 of "Darken" on the touch panel LCD 12, CPU 6 keeps the altering condition of "Darken" until it receives a signal instructing to the contrary, and CPU 6 records in DRAM 8 data indicating that the altering condition of "Darken" has been set. The user is allowed to change the alteration by touching the menu item 31 or 32, every time CPU 6 returns to step SA5.

At step SA6, CPU 6 is brought into a standby state for user's "touch operation" on the touch panel LCD 12 to select an object segment whose luminance level is to be altered. In the standby state, the user is allowed to touch his or her desired point on the image displayed on the touch panel LCD 12 to select an object segment whose luminance level is to be altered. When the user has touched the touch panel LCD 12 with his or her finger or with the pen and CPU 6 receives from the touch panel LCD 12 a signal indicating coordinates of the touch point at step SA6 (YES at step SA6), then CPU 6 advances to step SA7. Meanwhile, when CPU 6 receives from the touch panel LCD 12 no signal indicating coordinates of the touch point at step SA6 (NO at step SA6), then CPU 6 advances to step SA8. The user is allowed to touch an arbitrary point on the image to select an object segment, every time CPU 6 returns to step SA6, whereby the user can touch plural object segments.

Figure 5:
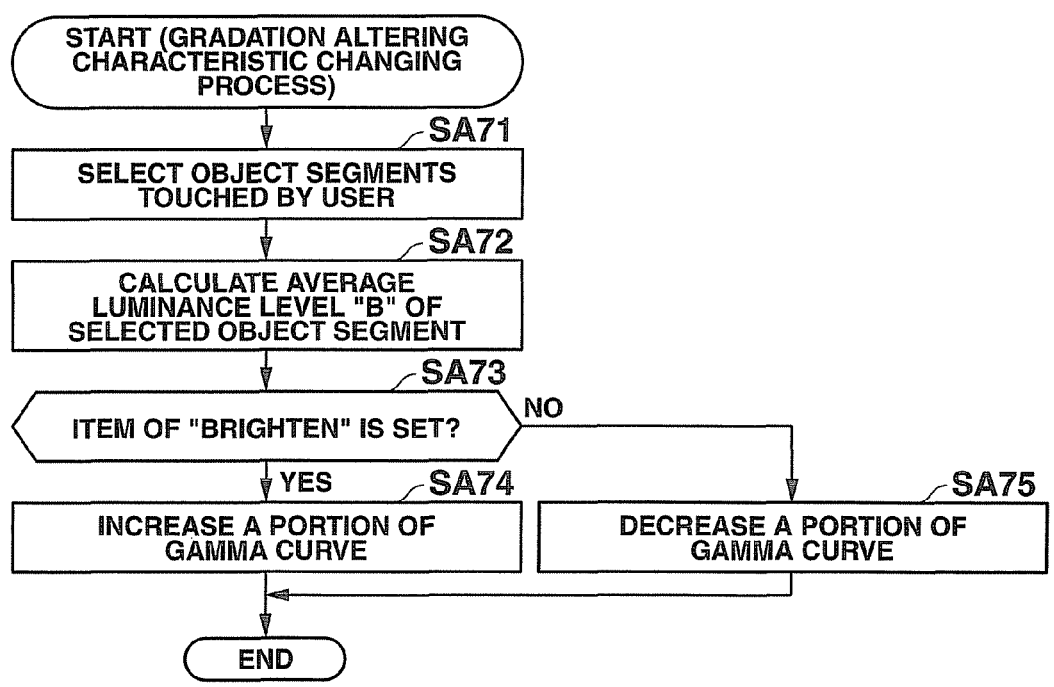
FIG. 5 is a flow chart of a gradation altering characteristic changing process performed in the first embodiment.

CPU 6 performs a gradation-altering characteristic changing process at step SA7. FIG. 5 is a flow chart showing the gradation-altering characteristic changing process performed at step SA7. The gradation-altering characteristic changing process will be described in detail with reference to the flow chart of FIG. 5.

At step SA71 in FIG. 5, CPU 6 supplies the signal received from the tough panel LCD 12 (signal indicating coordinates of the touch point) to the segment selecting unit 5c of the DSP 5. The segment selecting unit 5c confirms in the image expressed by digital signal stored in DRAM 8 an object segment (object segment touched by the user) including the coordinates of the touch point indicated by the signal supplied from CPU 6 and selects the confirmed object segment as an area whose luminance level is to be altered. The segment selecting unit 5c sends the light metering/calculating unit 5d a signal indicating the selected object segment. In the case the user touches plural object segments at step SA6 in FIG. 3, the segment selecting unit 5c selects the plural object segments as object segments whose luminance levels are to be altered, every time CPU 6 returns to step SA71 in FIG. 5.

At step SA72, CPU 6 makes the light metering/calculating unit 5d of DSP 5 calculate an average luminance level "B" of the selected object segment of the image expressed by digital signal stored in DRAM 8. The average luminance level "B" is an average of luminance levels of picture elements composing the object segment selected at step SA71.

CPU 6 judges at step SA73 whether or not the menu item 31 of "Brighten" is set currently. More specifically, CPU 6 confirms data stored in DRAM 8, indicating the currently set altering condition, thereby judging whether or not the menu item 31 of "Brighten" is set currently. When it is determined that the menu item 31 of "Brighten" is currently set (YES at step SA73), CPU 6 advances to step SA74. Meanwhile, when it is determined that the menu item 31 of "Brighten" is not currently set (NO at step SA73), CPU 6 determines that the menu item 32 of "Darken" is currently set, and advances to step SA75.

At step SA74, CPU 6 makes the gamma characteristic changing unit 5f of DSP 5 change the gamma curve G1 (gradation altering characteristic). More specifically, under control of CPU 6, the gamma characteristic changing unit 5f changes the gamma curve G1 in a predetermined range ΔB (for example, ΔB is 10) in the vicinity of the average luminance level of "B" calculated at step SA72. For example, the gamma characteristic changing unit 5f partially increases a portion of the gamma curve G1 in a range of input luminance levels form (B−ΔB) to (B+ΔB). The increased portion of the gamma curve G1 can be replaced with a spline curve passing through three points such as a first point, a second point and a third point on the gamma curve G1, wherein the first point is a point on the gamma curve 51 corresponding to the input luminance level (B−ΔB), the second point is a point where an output luminance level is given by a doubled input luminance level (doubled average luminance level "B") "2B", and the third point is a point on the gamma curve G1 corresponding to the input luminance level (B+ΔB). The spline curve is a line generated by a well known spline curve interpolation method.

At step SA75, CPU 6 makes the gamma characteristic changing unit 5f of DSP 5 change the gamma curve G1 (gradation altering characteristic). More specifically, under control of CPU 6, the gamma characteristic changing unit 5f changes the gamma curve G1 in a predetermined range ΔB in the vicinity of the average luminance level of "B" calculated at step SA72. For example, the gamma characteristic changing unit 5f partially decreases a portion of the gamma curve G1 in a range of input luminance levels form (B−ΔB) to (B+ΔB). The decreased portion of the gamma curve G1 can be replaced with a spline curve passing through three points such as a first point, a second point and a third point on the gamma curve G1, wherein the first point is a point on the gamma curve G1 corresponding to the input luminance level (B−ΔB), the second point is a point where an output luminance level is given by half (0.5 c) of the input luminance level (average luminance level) "B", and the third point is a point on the gamma curve G1 corresponding to the input luminance level (B+ΔB).

Figure 6:
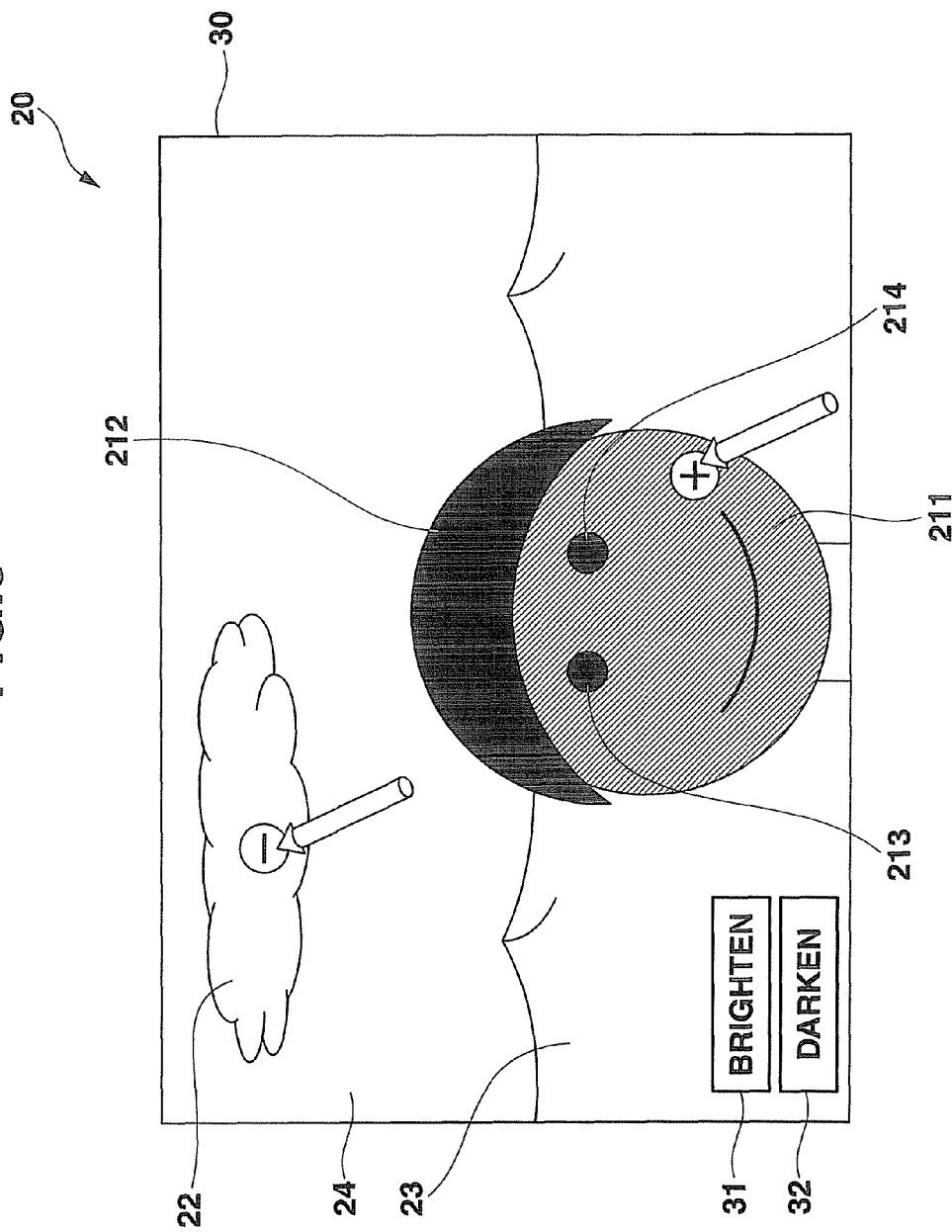
FIG. 6 is a view illustrating the image displayed on the touch panel LCD 12, touched with a pen in the first embodiment.

In FIG. 6 is illustrated the image 20 displayed on the touch panel LCD 12 (shown in FIG. 4), which has been processed as followed. The menu item 31 of "Brighten" is touched, and a point within the segment of the human face 211 is touched with the altering condition of "Brighten" set, and thereafter the menu item 32 of "Darken" is touched, and a point within the segment of the cloud 22 is touched with the altering condition of "Darken" set. In FIG. 6, a mark of "+" indicates that the segment of the human face 211 with the mark of "+" attached is touched by the user to make higher the luminance level thereof, and a mark of "−" indicates that the segment of the cloud 22 with the mark of "−" attached is touched by the user to make lower the luminance level thereof. As described, the user touches the object segment, thereby setting the object segment to altering condition of "Brighten" or altering condition of "Darken".

Figure 7:
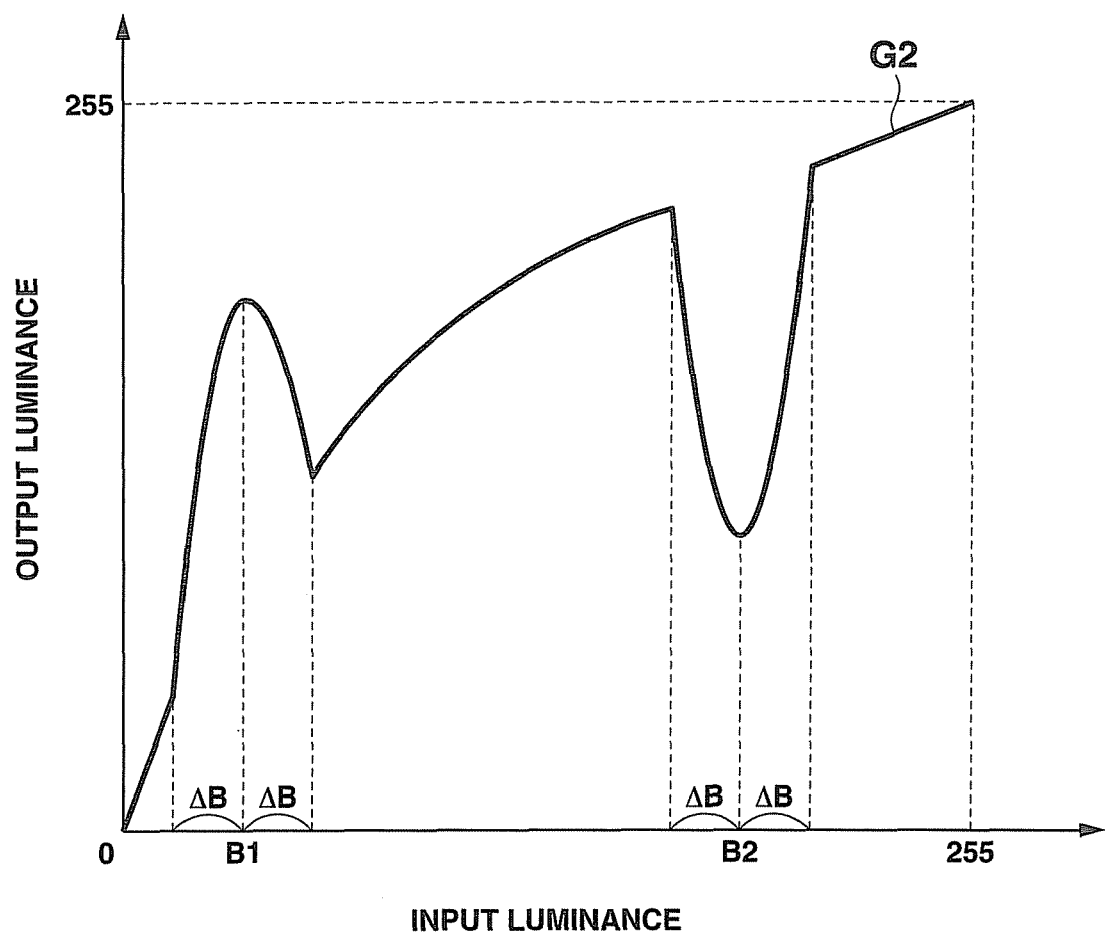
FIG. 7 is a view showing an example of a gamma curve G2 changed in the gradation altering characteristic changing process in the first embodiment.

In FIG. 7 is shown an example of a gamma curve G2 changed in the gradation-altering characteristic changing process at step SA7. The gamma curve G2 shown in FIG. 7 is a curve changed in the gradation-altering characteristic changing process performed with respect to the image shown in FIG. 6. In FIG. 7, an input luminance level "B1" corresponds to the average luminance level of the segment of the human face 211 shown in FIG. 6 and an input luminance level "B2" corresponds to the average luminance level of the segment of the cloud 22 shown in FIG. 6. As shown in FIG. 7, in the range of input luminance levels from (B1−ΔB) to (B1+ΔB), a ratio of the output luminance level to the input luminance level in the gamma curve G2 subjected to the gradation-altering characteristic changing process is larger than a ratio of the output luminance level to the input luminance level in the gamma curve G1 not subjected to the gradation-altering characteristic changing process. Meanwhile, in the range of input luminance levels from (B2−ΔB) to (B2+ΔB), the ratio of the output luminance level to the input luminance level in the gamma curve G2 subjected to the gradation-altering characteristic changing process is less than the ratio of the output luminance level to the input luminance level in the gamma curve G1 not subjected to the gradation-altering characteristic changing process.

Having finished the process at step SA74 or at step SA75 in FIG. 5, that is, having finished the gradation-altering characteristic changing process at step SA7 in FIG. 3, CPU 6 advances to step SA8. When the gamma curve G1 has been changed to the gamma curve G2 in the gradation-altering characteristic changing process at step SA7, the image is subjected to the gamma correction process based on the gamma curve G2 and displayed on the touch panel LCD 12 as a live view display. In other words, when the gamma curve G1 has been changed to the gamma curve G2, the gamma correction processing unit 5e of DSP 5 performs the gamma correction process using the gamma curve G2 on the digital signal generated by AFE 4.

Figure 8:
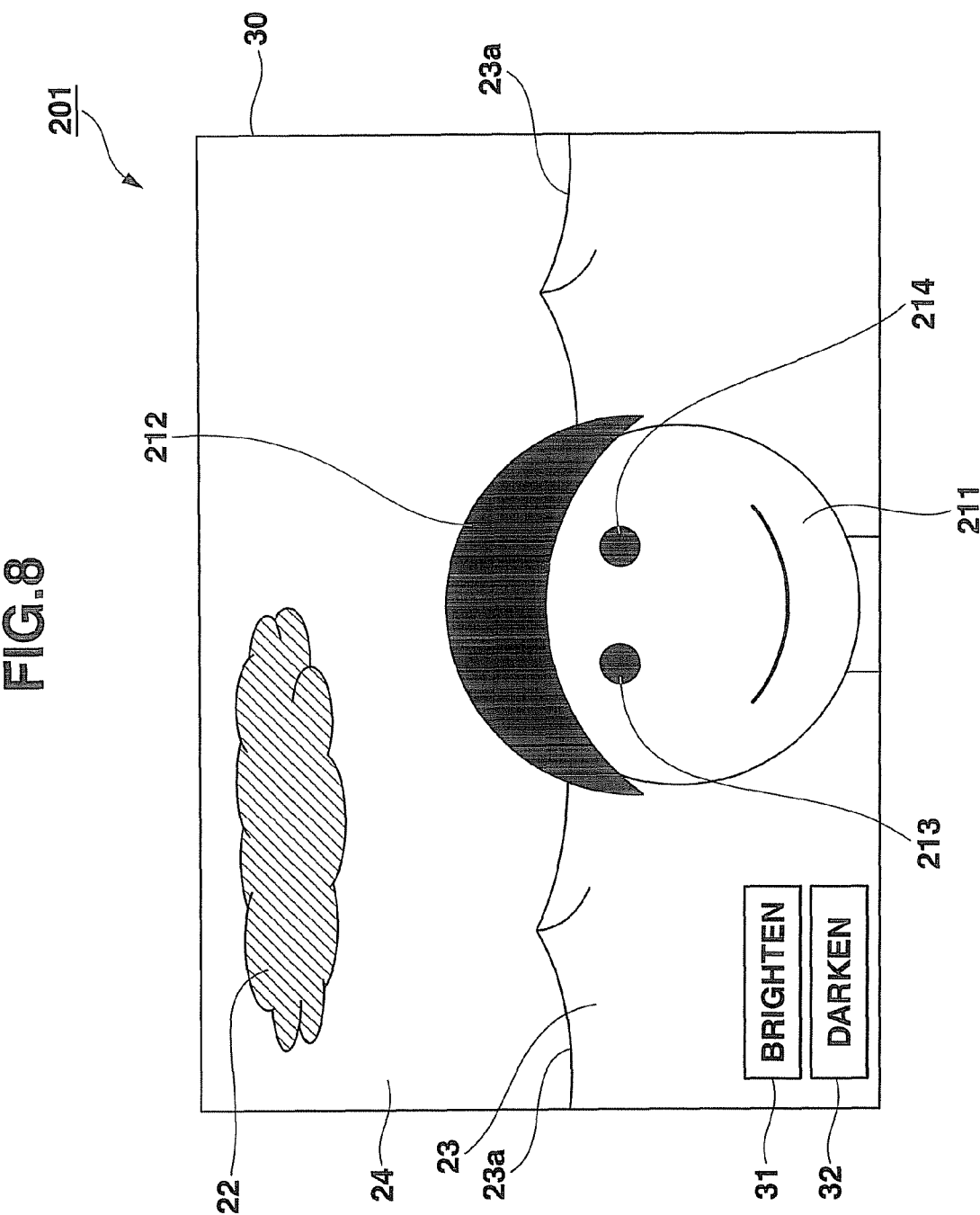
FIG. 8 is a view illustrating an image 201 generated from the image 20 which has been subjected to the gamma correction process using the gamma curve G2 in the first embodiment.

FIG. 8 is a view showing an image 201, which is obtained by performing on the image 20 the gamma correction process using the gamma curve G2. As shown in FIG. 8, the segment of the human face 211 in the image 201 is brighter than the segment of the human face 211 in the image 20 (subjected to the gamma correction process using the gamma curve G1). Meanwhile, the segment of the cloud 22 in the image 201 is darker than the segment of the cloud 22 in the image 20.

At step SA8 in FIG. 3, CPU 6 judges whether or not the user has operated the shutter key. Receiving from the key block 10 no signal corresponding to user's key operation, CPU 6 determines that the user has not operated the shutter key (NO at step SA8), and returns to step SA4. Meanwhile, when the user has operated the shutter key, CPU 6 receives the signal corresponding to user's key operation from the key block 10 and determines that the user has operated the shutter key (YES at step SA8), advancing to step SA9.

CPU 6 makes the shutter mechanism 2 open and close at step SA9 to shoot an object to accumulate an image signal in CCD 3. CPU 6 makes AFE 4 produce a digital signal from the image signal accumulated in CCD 3. Further, CPU 6 makes DSP 5 perform various processes including the gamma correction process on the digital signal to produce image data, compressing the image data and generating data in JPEG format (Joint Photographic Experts Group format). During the above process, the gamma correction processing unit 5e of DSP 5 performs the gamma correction process using the gamma curve G2 (gradation altering characteristic) changed at step SA7 on the digital signal. In the image expressed by the resultant image data, luminance levels of the user's desired object segments are adjusted according to his or her intention.

CPU 6 records the image data generated at step SA9 in the memory card 9 at step SA10. As a result, in the first embodiment it is possible to record an image, in which luminance levels of the user's desired object segments are adjusted according to his or her intention.

Having finished the process at step SA10, CPU 6 finishes the process in the shooting mode, shown by the flow chart of FIG. 3.

In the digital camera 100 according to the first embodiment described above, plural areas defined by contours in the image are set as object segments, and thereafter the gradation altering characteristic (gamma curve) is changed to alter the luminance level of each of the object segments selected in response to user's touch operation. In this way, before the user touches the touch panel LCD 12 to alter the luminance level of his or her desired object segment, the whole area of each object in the image can be previously set as a segment whose luminance level is to be altered. This allows the user to alter the luminance level of the whole object segment simply by touching once his or her desired object segment in the image displayed on the touch panel LCD 12. As a result, in the digital camera 100 according to the first embodiment, the user can alter the luminance level (brightness) of the whole of his or her desired object segment simply by touching such object segment once.

In the digital camera 100 according to the first embodiment, plural areas defined by contours in the image are set as object segments, and the gradation altering characteristic (gamma curve) is changed to alter luminance levels of object segments selected by user's touch operation. In this way, the user can select any object segment in the image displayed on the touch panel LCD 12 as a segment whose luminance level is to be altered. As a result, in the digital camera 100 according to the first embodiment, the user can alter the luminance level (brightness) of an object segment in the image displayed on the touch panel LCD 12.

The digital camera 100 according to the first embodiment is arranged to allow the user make higher or lower the luminance level of the object segment in response to user's touch operation. Therefore, the user can alter the luminance level of the image displayed on the touch panel LCD 12 at his or her intention.

In the digital camera 100 according to the first embodiment, plural areas defined by contours in the image are automatically set as object segments, whose luminance levels are to be altered. Even if an object seen in the image displayed on the touch panel LCD 12 is large, the user is allowed to set plural object segments in the image as segments whose luminance levels are to be altered, simply by touching once his or her desired object segments in the image.

Second Embodiment of the Invention

The second embodiment of the invention will be described in detail. Since the digital camera 100 according to the second embodiment of the invention is substantially the same as the digital camera 100 according to the first embodiment, and therefore the detailed description thereof will be omitted.

Figure 9:
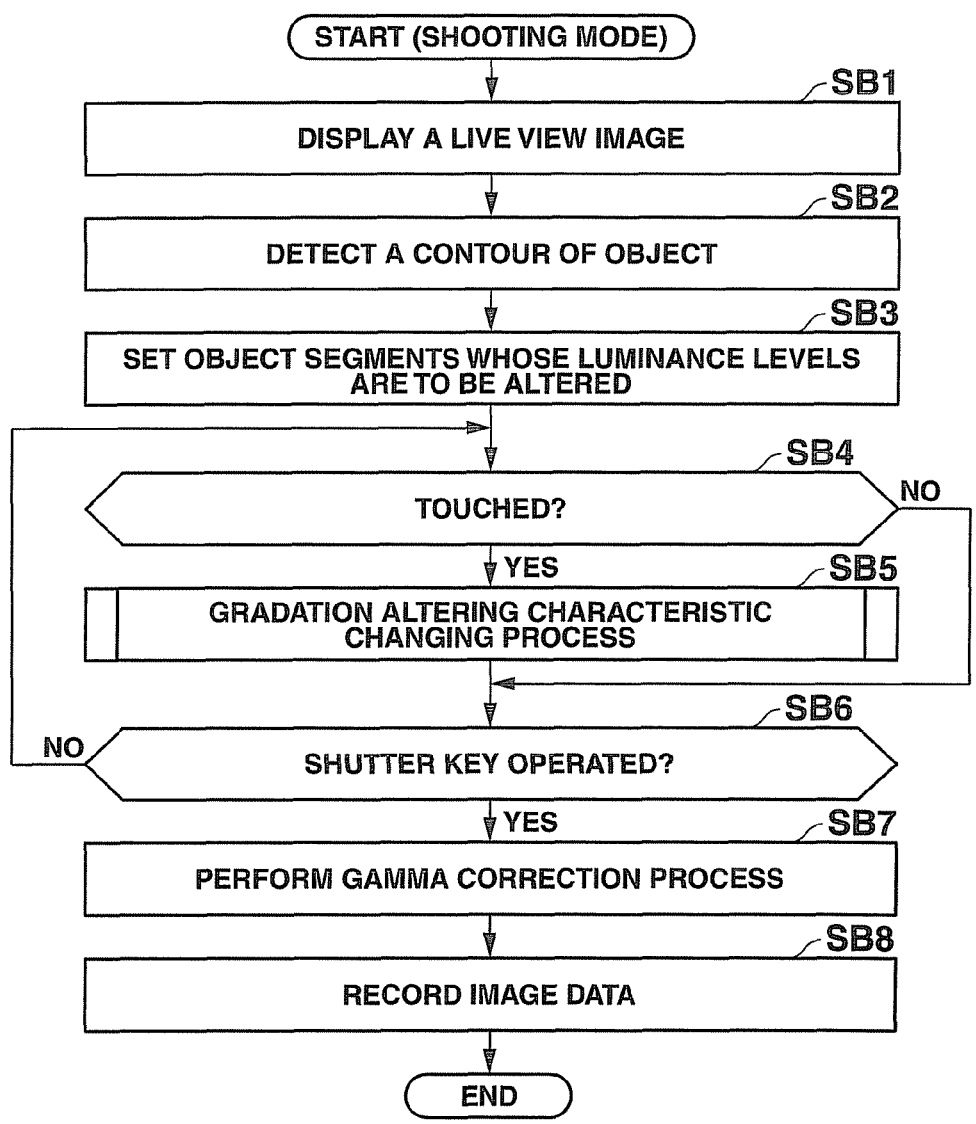
FIG. 9 is a flow chart of an operation performed in the shooting mode in the second embodiment of the invention.

FIG. 9 is a flow chart of an operation performed by the digital camera 100 in the shooting mode in the second embodiment of the invention. CPU 6 reads the program from the flash memory 7 and expands the program on DRAM 8, thereby performing the operation in accordance with the flow chart of FIG. 9. The operation performed by the digital camera 100 in the shooting mode will be described with reference to the flow chart of FIG. 9.

Figure 10:
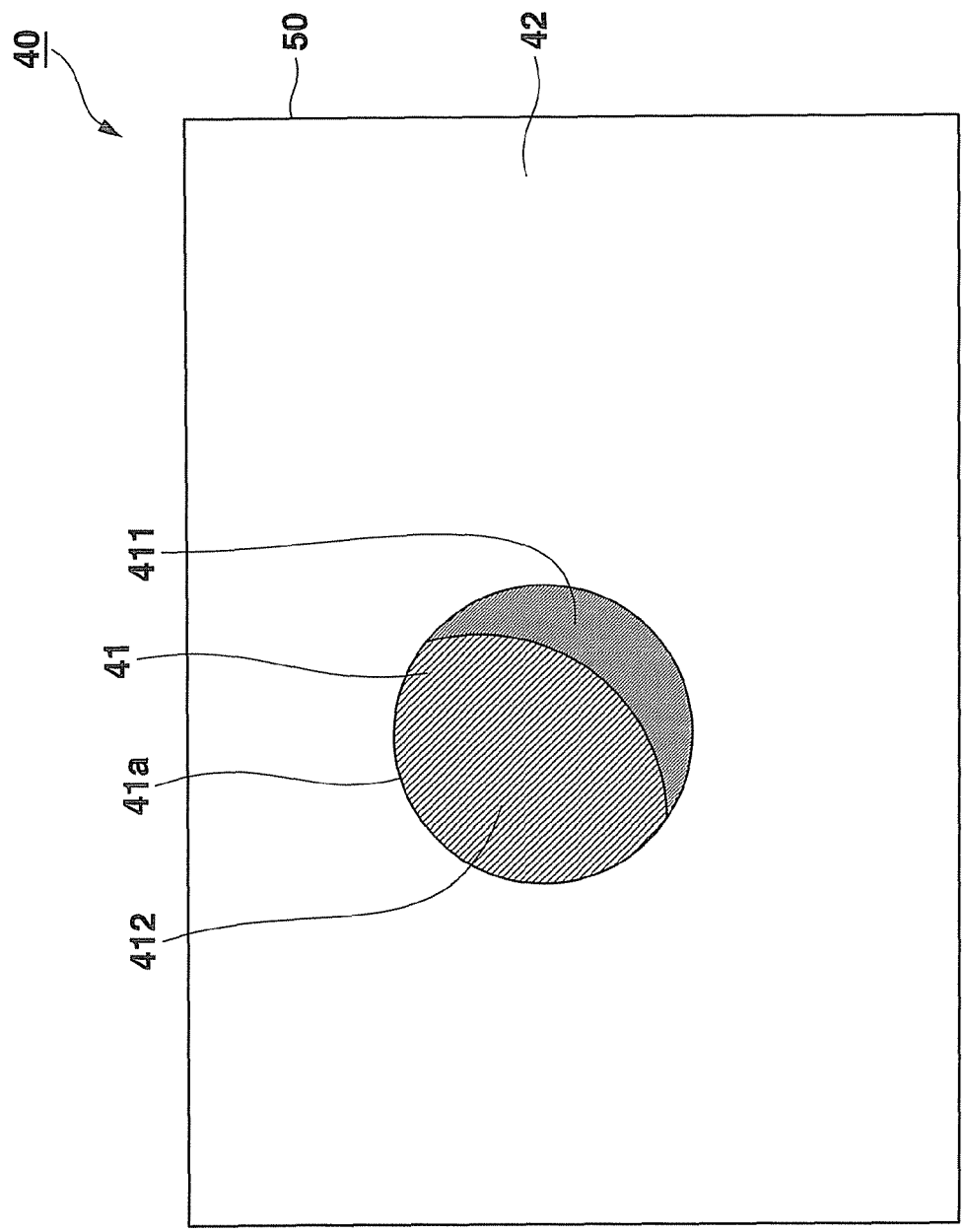
FIG. 10 is a view illustrating an example of an image 40 displayed on the touch panel LCD 12 in the second embodiment.

CPU 6 starts a displaying process to display an image (a live view image) on the touch panel LCD 12 at step SB1. The displaying process at step SB1 is substantially the same as the process at step SA1 in the first embodiment. An image which is subjected to the gamma correction using the gamma curve G1 shown in FIG. 2 is first displayed on the touch panel LCD 12. For example, in the case that an image 40 shown in FIG. 10 is shot in a live view displaying process, the image which is generated from the image 40 subjected to the gamma correction process using the gamma curve G1 is displayed on the touch panel LCD 12 at the beginning. In the image 40 shown in FIG. 10, objects such as a ball 41 and background 42 are seen within an external frame 50 defining a shooting angle. A segment of the ball 41 includes a dark segment 411 whose luminance level is lower than an average luminance level "B3" of the ball 41 and a bright segment 412 whose luminance level is higher than the average luminance level "B3" of the ball 41. The average luminance level "B3" of the ball 41 is equivalent to an average of luminance levels of all the picture elements composing the segment of the ball 41.

At step SB2, CPU 6 makes the contour detecting unit 5a of DSP 5 detect a contour in an image that is expressed by a digital signal and displayed on the touch panel LCD 12. For example, in the image 40 shown in FIG. 10, a contour 41a of the ball 41 is detected at step SB2.

At step SB3, CPU 6 makes the segment setting unit 5b of DSP 5 set plural areas defined by the contours detected at step SB2 as plural object segments whose luminance levels are to be altered. Take for example the image 40 shown in FIG. 10, the object segments are areas where the ball 41 and background 42 are seen respectively.

At step SB4, CPU 6 is brought into a standby state for user's "touch operation" on the touch panel LCD 12 to select an object segment whose luminance level is to be altered. In the standby state, the user is allowed to touch his or her desired point on the image displayed on the touch panel LCD 12 to select an object segment whose luminance level is to be altered. When the user has touched the touch panel LCD 12 with his or her finger or with the pen and CPU 6 receives from the touch panel LCD 12 a signal indicating coordinates of the touch point at step SB4 (YES at step SB4), then CPU 6 advances to step SB5. Meanwhile, when CPU 6 receives from the touch panel LCD 12 no signal indicating coordinates of the touch point at step SB4 (NO at step SB4), then CPU 6 advances to step SB6. The user is allowed to touch any area on the image to select an object segment, every time CPU 6 returns to step SB4, whereby plural object segments are selected.

Figure 11:
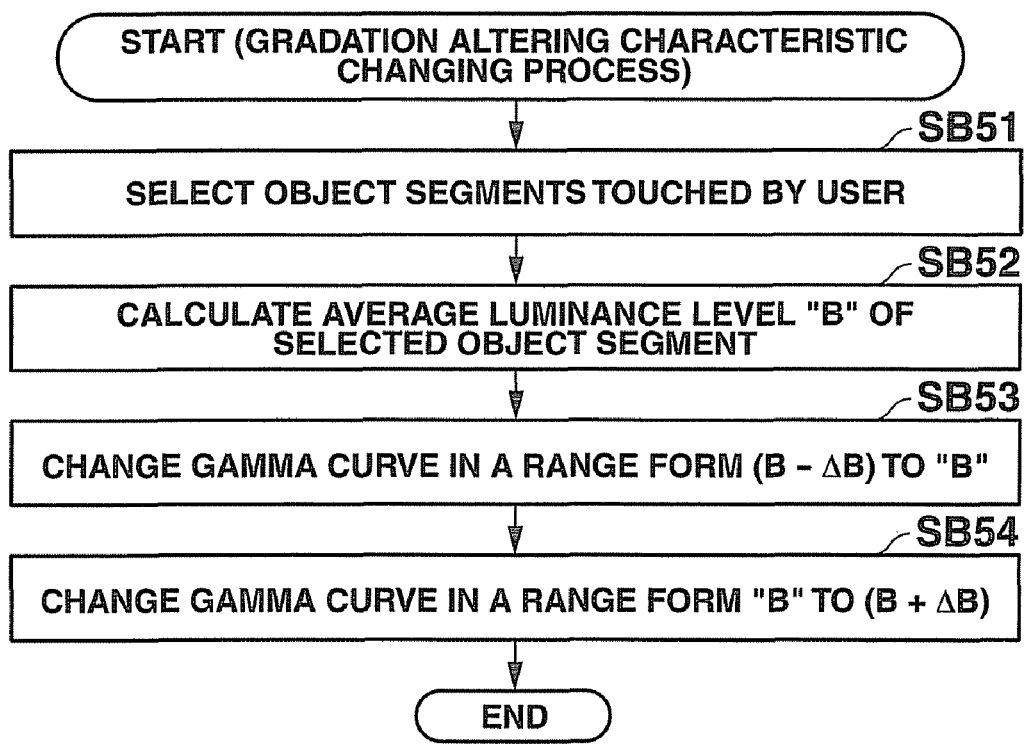
FIG. 11 is a flow chart of a gradation altering characteristic changing process performed in the second embodiment.

CPU 6 performs a gradation-altering characteristic changing process at step SB5. FIG. 11 is a flow chart showing the gradation-altering characteristic changing process performed at step SB5. The gradation-altering characteristic changing process will be described in detail with reference to the flow chart of FIG. 11.

CPU 6 supplies the signal (signal indicating coordinates of the touch point) sent from the touch panel LCD 12 to the segment selecting unit 5c at step SB51 in FIG. 11. The segment selecting unit 5c selects the object segment (touched object segment) including the coordinates of the touch point indicated by the signal supplied from CPU 6 as a segment whose luminance level is to be altered. The segment selecting unit 5c sends a signal indicating the segments selected at step SB51 to the light metering/calculating unit 5d. In the case that plural object segments are touched by the user at step SB4, the segment selecting unit 5c selects the plural touched object segments as segments whose luminance level are to be altered.

At step SB52, CPU 6 makes the light metering/calculating unit 5d of DSP 5 calculate an average luminance level "B" of the selected object segment of the image expressed by digital signal stored in DRAM 8. The average luminance level "B" is an average of luminance levels of picture elements composing the object segment selected at step SB51.

At step SB53, CPU 6 makes the gamma characteristic changing unit 5f of DSP 5 change the gamma curve G1 (gradation altering characteristic). More specifically, the gamma characteristic changing unit 5f decreases a portion of the gamma curve G1 in a range of input luminance levels from (B−ΔB) to "B" with reference to the average luminance level "B" calculated at step SB52. The decreased portion of the gamma curve G1 can be replaced with a spline curve passing through three points such as a first point, a second point and a third point on the gamma curve G1, wherein the first point is a point on the gamma curve G1 corresponding to the input luminance level (B−ΔB), the second point is a point where an output luminance level is given by half of the input luminance level (average luminance level) "B", and the third point is a point on the gamma curve G1 corresponding to the input luminance level "B".

At step SB54, CPU 6 makes the gamma characteristic changing unit 5f of DSP 5 change the gamma curve G1 (gradation altering characteristic). More specifically, under control of CPU 6, the gamma characteristic changing unit 5f increases a portion of the gamma curve G1 in a range of input luminance levels from "B" to (B+ΔB) with reference to the average luminance level "B" calculated at step SB52. The increased portion of the gamma curve G1 can be replaced with a spline curve passing through three points such as a first point, a second point and a third point on the gamma curve G1, wherein the first point is a point on the gamma curve G1 corresponding to the input luminance level "B", the second point is a point where an output luminance level is given by a doubled input luminance level (average luminance level "B") "2B", and the third point is a point on the gamma curve G1 corresponding to the input luminance level (B+ΔB).

Figure 12:
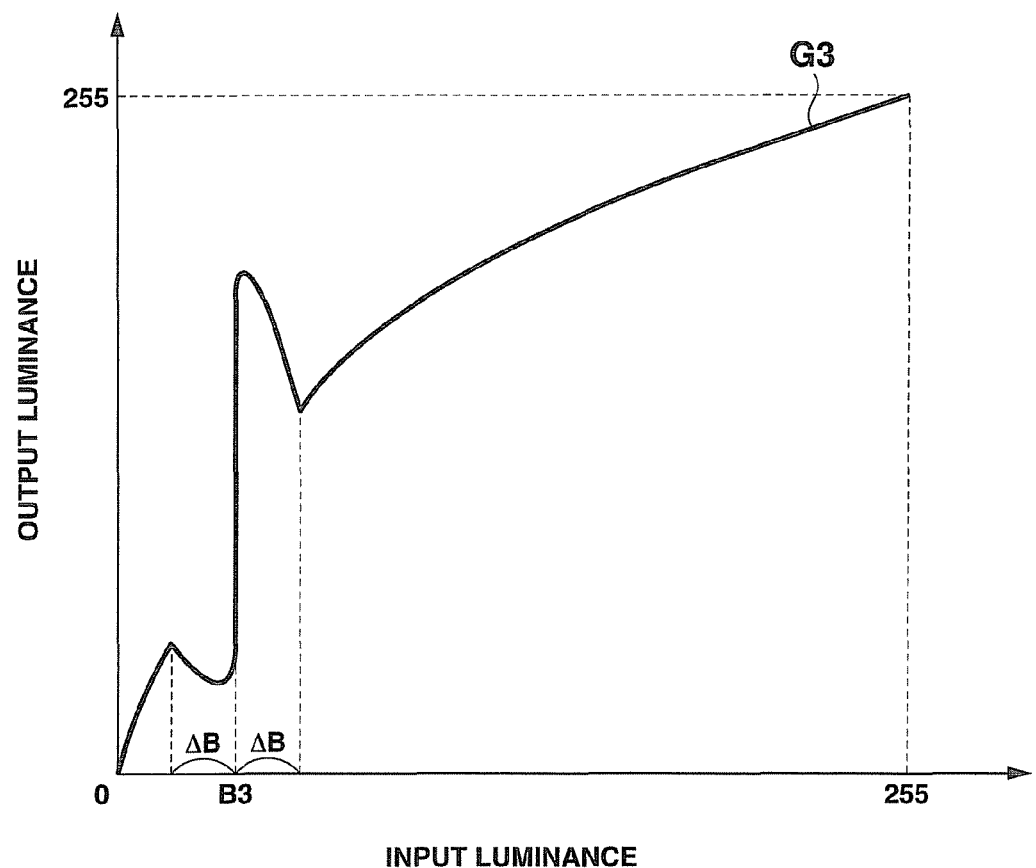
FIG. 12 is a view showing an example of a gamma curve G3 changed in the gradation altering characteristic changing process in the second embodiment.

FIG. 12 is a view showing an example of the gamma curve changed in the gradation-altering characteristic changing process performed at step SB5 in FIG. 9. In FIG. 12 is shown a gamma curve G3, which is changed in the gradation-altering characteristic changing process when the user has touched a point within the segment of the ball 41 in the image 40 shown in FIG. 10. In FIG. 12, an input luminance level "B3" corresponds to the average luminance level of the segment of the ball 41 calculated by the light metering/calculating unit 5d at step SB52. As shown in FIG. 12, in the range of input luminance levels from (B3−ΔB) to "B3", a ratio of the output luminance level to the input luminance level in the gamma curve G3 subjected to the gradation-altering characteristic changing process is less than a ratio of the output luminance level to the input luminance level in the gamma curve G1 not subjected to the gradation-altering characteristic changing process. Meanwhile, in the range of input luminance levels from "B3" to (B3+ΔB), the ratio of the output luminance level to the input luminance level in the gamma curve G3 subjected to the gradation-altering characteristic changing process is larger than the ratio of the output luminance level to the input luminance level in the gamma curve G1 not subjected to the gradation-altering characteristic changing process.

Having finished the processes at steps SB53 and SB54 in FIG. 11, that is, having finished the gradation-altering characteristic changing process at step SB5 in FIG. 9, CPU 6 advances to step SB6. Once the gamma curve G1 has been changed to the gamma curve G3 in the gradation-altering characteristic changing process at step SB5, the image is subjected to the gamma correction process based on the gamma curve G3 and displayed on the touch panel LCD 12 as a live view display. In other words, when the gamma curve G1 has been changed to the gamma curve G2, the gamma correction processing unit 5e of DSP 5 performs the gamma correction process using the gamma curve G3 on the digital signal.

Figure 13:
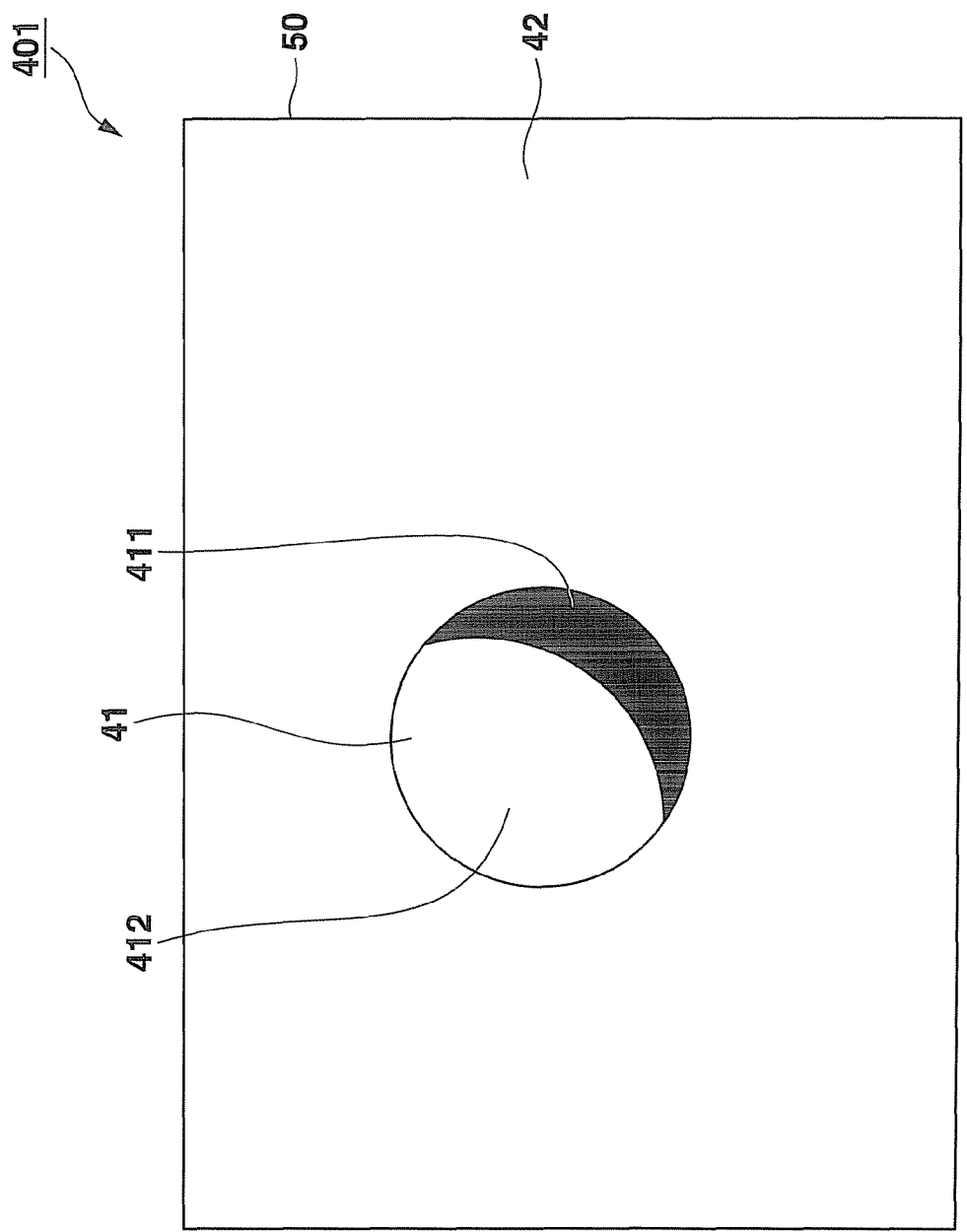
FIG. 13 is a view illustrating an image 401 generated from the image 40 which has been subjected to the gamma correction process using the gamma curve G3 in the first embodiment.

FIG. 13 is a view showing an image 401, which has been obtained by performing the gamma correction process using the gamma curve G3 on the image 40 shown in FIG. 10. As shown in FIG. 13, the dark segment 411 of the ball 41 in the image 401 is darker than the dark segment 411 of the ball 41 in the image 40 (FIG. 10). This is because luminance levels of all the picture elements composing the dark segment 411 in the image 40 fall within a range from (B−ΔB) to "B" and the output luminance level of the dark segment 411 subjected to the gamma correction process using the gamma curve G3 is less than the output luminance level of the dark segment 411 subjected to the gamma correction process using the gamma curve G1, which has not yet been changed.

Meanwhile, as shown in FIG. 13 the bright segment 412 in the image 401 is brighter than the bright segment 412 in the image 40 (FIG. 10). This is because luminance levels of all the picture elements composing the dark segment 412 in the image 40 fall within a range from "B" to (B+ΔB) and the output luminance level of the dark segment 412 subjected to the gamma correction process using the gamma curve G3 is higher than the output luminance level of the dark segment 412 subjected to the gamma correction process using the gamma curve G1, which has not yet been changed.

As described, when the image 40 is subjected to the gamma correction process using the gamma curve G3, contrast in a segment of the ball 41 where the user touches in the image 401 is enhanced, wherein the contrast means a difference in luminance between the dark segment 411 and bright segment 412.

At step SB6 in FIG. 9, CPU 6 judges whether or not the user has operated the shutter key. Receiving from the key block 10 no signal corresponding to user's key operation, CPU 6 determines that the user has not operated the shutter key (NO at step SB6), and returns to step SB4. Meanwhile, when the user has operated the shutter key, CPU 6 receives the signal corresponding to user's key operation from the key block 10 and determines that the user has operated the shutter key (YES at step SB6), advancing to step SB7.

CPU 6 makes the shutter mechanism 2 open and close at step SB7 to shoot an object to accumulate an image signal in CCD 3. CPU 6 makes AFE 4 produce a digital signal based on the image signal accumulated in CCD 3. Further, CPU 6 makes DSP 5 perform various processes including the gamma correction process on the digital signal to produce image data, compressing the image data and generating data in JPEG format (Joint Photographic Experts Group format). During the above process, the gamma correction processing unit 5e of DSP 5 performs the gamma correction process using the gamma curve G3 changed at step SB5 on the produced digital signal. In the image expressed by the image data generated at step SB SB7, contrast of the user's desired object segment is enhanced.

CPU 6 records the image data generated at step SB7 in the memory card 9 at step SB8. As a result, in the second embodiment it is possible to record an image, in which contrast in the user's desired object segment is enhanced.

Having finished the process at step SB8, CPU 6 finishes the operation in the shooting mode, shown by the flow chart of FIG. 9.

In the digital camera 100 according to the second embodiment described above, plural areas defined by contours in the image are set as object segments, and thereafter the gradation altering characteristic (gamma curve) is changed to alter the luminance levels of the object segments selected in response to user's touch operation. In this way, before the user touches the touch panel LCD 12 to alter the luminance levels of his or her desired object segments, the whole area of each object in the image can be previously set as the segment whose luminance level is to be altered. This allows the user to alter the luminance level of the whole object segment simply by touching once his or her desired object segment in the image displayed on the touch panel LCD 12. As a result, in the digital camera 100 according to the second embodiment, the user can alter the luminance level (brightness) of the whole of his or her desired object segment simply by touching the object segment once.

In the digital camera 100 according to the second embodiment, plural areas defined by contours in the image are set as object segments, and the gradation altering characteristic (gamma curve) is changed to alter luminance levels of object segments selected by user's touch operation. In this way, the user can select an object segment in the image displayed on the touch panel LCD 12 as a segment whose luminance level is to be altered. As a result, in the digital camera 100 according to the second embodiment, the user can alter a brightness level of an object segment in the image displayed on the touch panel LCD 12.

In the digital camera 100 according to the second embodiment, the luminance level of the bright segment of the object segment selected in response to the touch operation is automatically made higher and the luminance level of the dark segment of the object segment selected in response to the touch operation is automatically made lower simply by touching once his or her desired object segment displayed on the touch panel LCD 12, wherein the bright segment is a segment whose luminance level is higher than an average luminance level of the object segment and the dark segment is a segment whose luminance level is lower than the average luminance level of the object segment. In this way, the user can enhance contrast or increase a difference in luminance level between the bright segment and dark segment in his or her desired object segment simply by touching such object segment once. In other words, in the digital camera 100 according to the second embodiment, the user can enhance the contrast in his or her desired segment in the image by a simple operation, such as, touching the touch panel LCD 12 once.

In the digital camera 100 according to the second embodiment, plural areas defined by contours in the image are automatically set as object segments, whose luminance levels are to be altered. Even if an object is complex in shape, the above arrangement allows the user to set plural object segments in the image as segments whose luminance levels are to be altered, simply by touching once his or her desired object segment in the image.

Modifications

The embodiments have been described in the foregoing detailed description by way of examples of the invention and it should be understood that the invention is not limited to the particular embodiments described herein, but numerous rearrangements, modifications, and substitutions may be made to the embodiments of the invention without departing from the scope of the invention.

Figure 14:
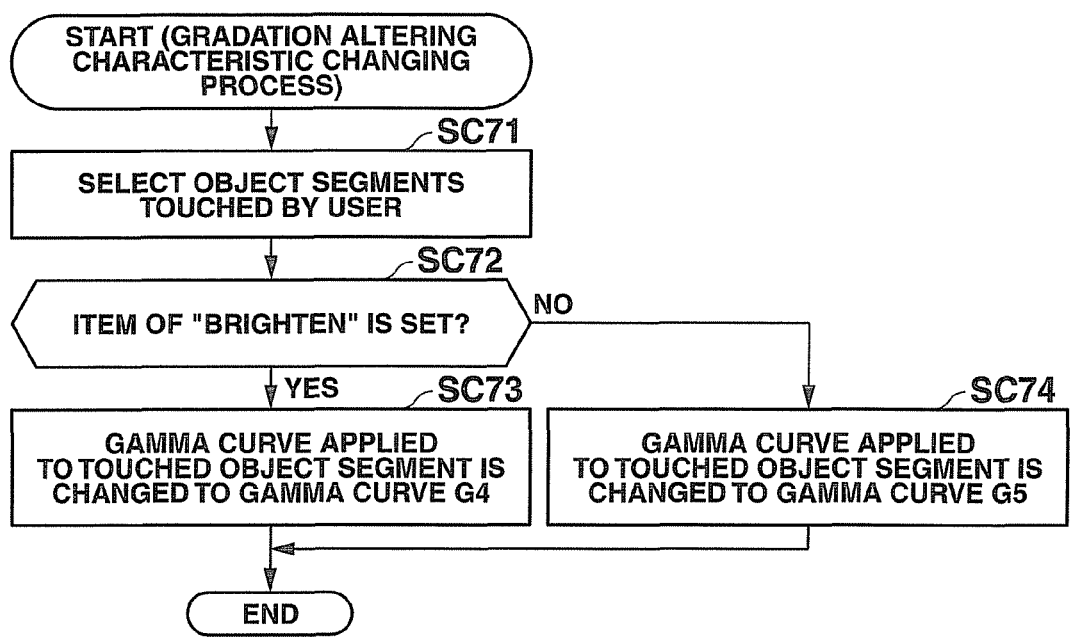
FIG. 14 is a flow chart of a gradation altering characteristic changing process performed in the modification to the first embodiment.

FIG. 14 is a flow chart of a modified process of the gradation-altering characteristic changing process performed at step SA7 in FIG. 3. The modified gradation-altering characteristic changing process will be described in detail with reference to the flow chart of FIG. 14. In the digital camera 100, the modified gradation-altering characteristic changing process shown in FIG. 14 is performed in place of the gradation-altering characteristic changing process shown in FIG. 5.

A process to be performed at step SC71 in FIG. 14 is substantially the same as the process performed at step SA71 in FIG. 5, and therefore the description thereof will be omitted. Further, a process to be performed at step SC72 is substantially the same as the process performed at step SA73 in FIG. 5, and therefore the description thereof will be omitted, too.

At step SC73, CPU 6 makes the gamma characteristic changing unit 5f of DSP 5 change the gamma curve (gradation altering characteristic) to be applied to the object segment touched by the user, or to be applied to the segment that is selected by the segment selecting unit 5c in response to user's touch operation. More specifically, under control of CPU 6, the gamma characteristic changing unit 5f of DSP 5 changes the gamma curve to be applied to the object segment touched by the user from the gamma curve G1 shown in FIG. 2 to a gamma curve G4 shown in FIG. 15. In other words, the gamma curve to be applied to the object segment touched by the user is changed to the gamma curve G4 at step SC73, and the gamma curve G1 shown in FIG. 2 is not changed at step SC73 and applied to the segment other than the object segment touched by the user (or the gamma curve G1 is applied to the segment other than the segment that is selected by the segment selecting unit 5c in response to user's touch operation).

After step SC73, a live view image is displayed on the touch panel LCD 12, in which live view image the object segments touched by the user have been subjected to the gamma correction process using the gamma curve G4 and the segment other than the object segment touched by the user is subjected to the gamma correction process using the gamma curve G1. In other words, the gamma correction processing unit 5e of DSP 5 performs the gamma correction process using the gamma curve G4 on the digital signal expressing the object segments in the image touched by the user and performs the gamma correction process using the gamma curve G1 on the digital signal expressing the segment other than the object segments in the image touched by the user.

Figure 15:
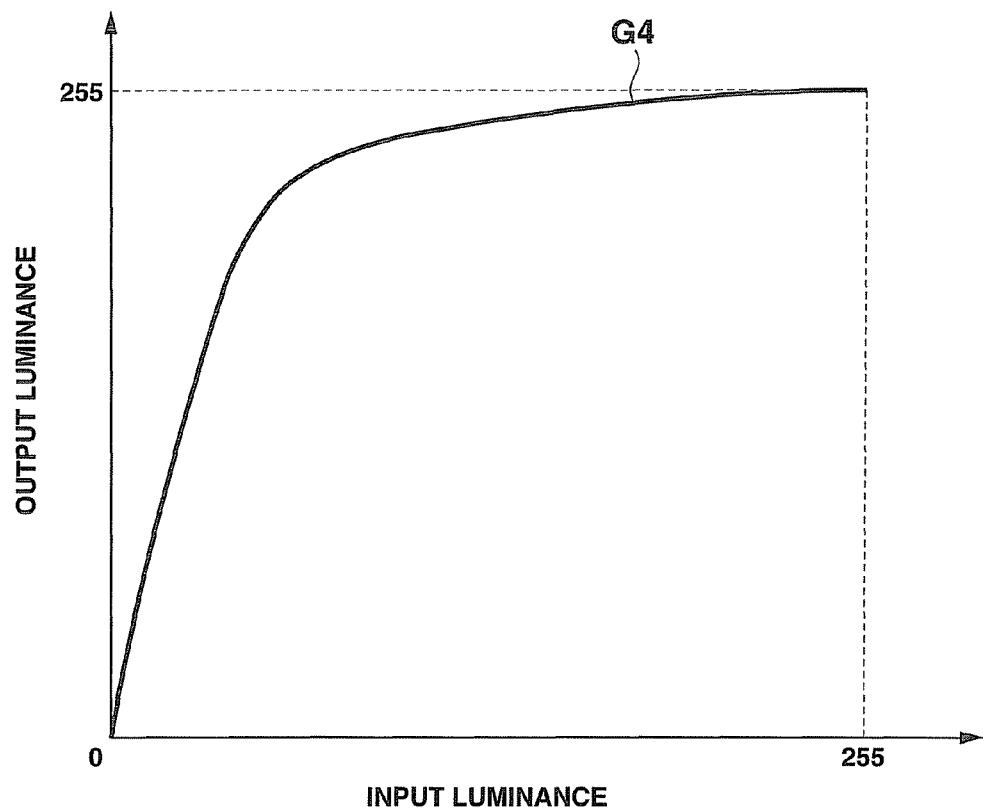
FIG. 15 is a view showing an example of a gamma curve applied in the modification to the first embodiment.

The gamma curve G4 shown in FIG. 15 has a characteristic that converts an input luminance level into an output luminance level that is higher than the input luminance level in the whole range of the input luminance levels (0-255). Therefore, the segment (object segment touched by the user) subjected to the gamma correction process using the gamma curve G4 at step SC73 is made more bright. The gamma curve applied to the object segment touched by the user in the process at step SC73 is not limited to the gamma curve G4 shown in FIG. 15 but any gamma curve may be used, that has a characteristic that converts the input luminance level into the output luminance level that is higher than the input luminance level in the whole range of the input luminance levels (0-255).

At step SC74, CPU 6 makes the gamma characteristic changing unit 5f of DSP 5 change the gamma curve to be applied to the object segment touched by the user at step SC71. More specifically, under control of CPU 6, the gamma characteristic changing unit 5f of DSP 5 changes the gamma curve to be applied to the object segment touched by the user from the gamma curve G1 shown in FIG. 2 to a gamma curve G5 shown in FIG. 16. As described, the gamma curve G5 changed at step SC74 is applied to the segment selected by the segment selecting unit 5c in response to user's touch operation, and meanwhile the gamma curve G1 shown in FIG. 2 is applied to the segment other than the object segment to which the gamma curve G5 is applied.

After step SC74, a live view image is displayed on the touch panel LCD 12, in which live view image the object segment touched by the user is subjected to the gamma correction process using the gamma curve G5 and the segment other than the object segment touched by the user is subjected to the gamma correction process using the gamma curve G1. In other words, the gamma correction processing unit 5e of DSP 5 performs the gamma correction process using the gamma curve G5 on the digital signal expressing the object segment of the image touched by the user and performs the gamma correction process using the gamma curve G1 on the digital signal expressing the segment other than the object segment of the image touched by the user.

Figure 16:
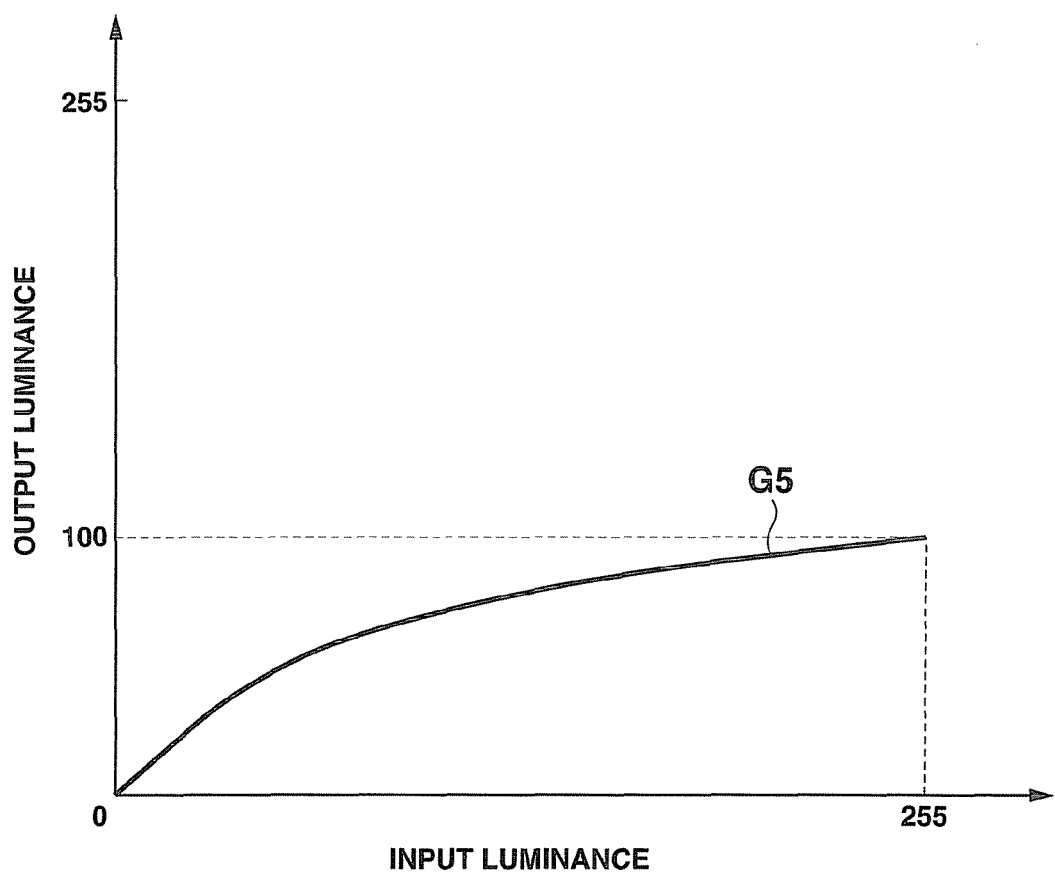
FIG. 16 is a view showing an example of a gamma curve applied in the modification to the first embodiment.

The gamma curve G5 shown in FIG. 16 has a characteristic that converts the input luminance level into the output luminance level that is lower than the input luminance level in the whole range of the input luminance levels (0-255). The segment (object segment touched by the user) subjected to the gamma correction process using a gamma curve G5 at step SC73 is made darker. The gamma curve applied to the object segment touched by the user in the process at step SC74 is not limited to the gamma curve G5 shown in FIG. 16 but any gamma curve may be used, that has a characteristic that converts the input luminance level into the output luminance level that is lower than the input luminance level in the whole range of the input luminance levels (0-255).

What is claimed is:

1. An image processing apparatus comprising:
    a gradation correcting unit that corrects a gradation of an image in accordance with a gradation altering characteristic;
    an object segment setting unit that sets in the image plural object segments whose luminance levels are to be altered;
    an object segment selecting unit that selects an object segment from the plural object segments set by the object segment setting unit in response to a first user operation;
    a gradation altering characteristic changing unit that changes the gradation altering characteristic in a luminance range of the object segment selected by the object segment selecting unit; and
    an altering condition setting unit that, in response to a second user operation, sets one of a first altering condition for increasing a luminance level of each of the plural object segments selected by the object segment selecting segment unit and a second altering condition for decreasing the luminance level,
    wherein the gradation altering characteristic changing unit changes the gradation altering characteristic in the luminance range corresponding to a luminance of the object segment selected by the object segment selecting unit, based on the first altering condition or the second altering condition set by the altering condition setting unit.

2. The image processing apparatus according to claim 1, further comprising:
    a contour detecting unit that detects one or more contours of an object in the image; wherein
    the object segment setting unit sets plural segments defined by the one or more contours detected by the contour detecting unit as at least a subset of the plural object segments whose luminance levels are to be altered.

3. The image processing apparatus according to claim 1, wherein
the object segment selecting unit selects one or more object segments from the plural object segments set by the object segment setting unit in response to the first user operation.

4. A computer-readable recording medium mounted on an image processing apparatus provided with a computer, the recording medium having recorded thereon a computer program that, in response to execution, causes the computer to function as units comprising:
a gradation correcting unit that corrects a gradation of an image in accordance with a gradation altering characteristic;
an object segment setting unit that sets in the image plural object segments whose luminance levels are to be altered;
an object segment selecting unit that selects an object segment from the plural object segments set by the object segment setting unit in response to a first user operation;
a gradation altering characteristic changing unit that changes the gradation altering characteristic in a luminance range of the object segment selected by the object segment selecting unit; and
an altering condition setting unit that, in response to a second user operation, sets one of a first altering condition for increasing a luminance level of each of the plural object segments selected by the object segment selecting unit and a second altering condition for decreasing the luminance level,
wherein the gradation altering characteristic changing unit changes the gradation altering characteristic in the luminance range corresponding to a luminance of the object segment selected by the object segment selecting unit based on the altering condition set by the altering condition setting unit.

5. An image processing apparatus comprising:
a gradation correcting unit that corrects a gradation of an image in accordance with a gradation altering characteristic;
an object segment setting unit that sets in the image plural object segments whose luminance levels are to be altered;
an object segment selecting unit that selects an object segment from the plural object segments set by the object segment setting unit in response to a first user operation;
a gradation altering characteristic changing unit that changes the gradation altering characteristic in a luminance range of the object segment selected by the object segment selecting unit; and
an average luminance calculating unit that calculates an average luminance level of the object segment selected by the object segment selecting unit,
wherein the gradation altering characteristic changing unit comprises a unit that makes a first change to the gradation altering characteristic in a luminance range less than the average luminance level calculated by the average luminance calculating unit such that a ratio of an output luminance level to an input luminance level in the gradation altering characteristic obtained after the first change is less than a ratio of an output luminance level to an input luminance level in the gradation altering characteristic obtained before the first change, and a unit that makes a second change to the gradation altering characteristic in a luminance range larger than the average luminance level calculated by the average luminance calculating unit such that a ratio of an output luminance level to an input luminance level in the gradation altering characteristic obtained after the second change is made larger than a ratio of an output luminance level to an input luminance level in the gradation altering characteristic obtained before the second change,
wherein the gradation altering characteristic changing unit changes the gradation altering characteristic in the luminance range corresponding to a luminance of the object segment selected by the object segment selecting unit so as to increase contrast in the object segment selected by the object segment selecting unit.

6. A computer-readable recording medium mounted on an image processing apparatus provided with a computer, the recording medium having recorded thereon a computer program that, in response to execution, causes the computer to function as units comprising:
a gradation correcting unit that corrects a gradation of an image in accordance with a gradation altering characteristic;
an object segment setting unit that sets in the image plural object segments whose luminance levels are to be altered;
an object segment selecting unit that selects an object segment from the plural object segments set by the object segment setting unit in response to a first user operation;
a gradation altering characteristic changing unit that changes the gradation altering characteristic in a luminance range of the object segment selected by the object segment selecting unit;
an average luminance calculating unit that calculates an average luminance level of the object segment selected by the object segment selecting unit,
a gradation altering characteristic changing unit for making a first change to the gradation altering characteristic in a predetermined luminance range less than the average luminance level calculated by the average luminance calculating unit such that a ratio of an output luminance level to an input luminance level in the gradation altering characteristic obtained after the first change is made less than a ratio of an output luminance level to an input luminance level in the gradation altering characteristic obtained before the first change, and for changing the gradation altering characteristic in a predetermined luminance range larger than the average luminance level calculated by the average luminance calculating unit such that a ratio of an output luminance level to an input luminance level in the gradation altering characteristic obtained after the second change is made larger than a ratio of an output luminance level to an input luminance level in the gradation altering characteristic obtained before the second change,
wherein the gradation altering characteristic changing unit changes the gradation altering characteristic in the luminance range corresponding to a luminance of the object segment selected by the object segment selecting unit so as to increase contrast in the object segment selected by the object segment selecting unit.

* * * * *